(12) United States Patent
Saito et al.

(10) Patent No.: US 6,810,096 B1
(45) Date of Patent: Oct. 26, 2004

(54) RECEPTION APPARATUS AND REPLICA SIGNAL GENERATING METHOD

(75) Inventors: Yoshiko Saito, Yokosuka (JP); Mitsuru Uesugi, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 689 days.

(21) Appl. No.: 09/743,986

(22) PCT Filed: May 30, 2000

(86) PCT No.: PCT/JP00/03445

§ 371 (c)(1),
(2), (4) Date: Jan. 18, 2001

(87) PCT Pub. No.: WO00/74266

PCT Pub. Date: Dec. 7, 2000

(30) Foreign Application Priority Data

May 31, 1999 (JP) ............................................. 11-152030

(51) Int. Cl.⁷ ............................. H03D 1/00; H03H 7/30; H04B 7/10
(52) U.S. Cl. ........................ 375/341; 375/232; 375/347
(58) Field of Search .......................... 370/342; 375/341, 375/200, 232, 347

(56) References Cited

U.S. PATENT DOCUMENTS

| | | | | |
|---|---|---|---|---|
| 4,328,585 A | * | 5/1982 | Monsen ...................... | 375/233 |
| 5,065,411 A | * | 11/1991 | Muto .......................... | 375/232 |
| 5,297,168 A | | 3/1994 | Sant'Agostino et al. | |
| 5,414,737 A | * | 5/1995 | Uesugi et al. .............. | 375/340 |
| 5,602,832 A | * | 2/1997 | Hudson ...................... | 370/342 |
| 5,757,846 A | * | 5/1998 | Vasudevan .................. | 375/130 |
| 5,898,736 A | * | 4/1999 | Saito et al. ................ | 375/316 |

FOREIGN PATENT DOCUMENTS

| | | |
|---|---|---|
| CA | 2051858 | 3/1992 |
| JP | 61135237 | 6/1986 |
| JP | 5014130 | 1/1993 |
| JP | 6120774 | 4/1994 |
| JP | 6350328 | 12/1994 |
| JP | 9116388 | 5/1997 |
| JP | 10336083 | 12/1998 |
| JP | 00188567 | 7/2000 |

OTHER PUBLICATIONS

Chinese Office Action dated Jan. 10, 2003 with English translation.
PCT International Search Report dated Aug. 15, 2000.
Kazuhiko Fukawa, "A Spatio–Temporal Equalization Technique in High Speed Digital Mobile Communications –An Adaptive Array–MLSE Cascading Connection for Sparse Channel Signal Combining–", IEICE General Conference 1999, B–5–41, p. 392.

* cited by examiner

Primary Examiner—Stephen Chin
Assistant Examiner—Cicely Ware
(74) Attorney, Agent, or Firm—Stevens, Davis, Miller & Mosher, LLP

(57) ABSTRACT

Signal component converging section 105 delays received signal components spread on a time axis to combine signal components based on an output of propagation path estimating section 104, maximum value detecting section 106 detects a sample timing of a signal component with the maximum power among signal components combined in signal component converging section 105, and tap coefficient estimating section 107 estimates a tap coefficient that minimizes a mean square of a difference between a replica signal and a received signal while assigning a tap coefficient of a fixed value (for example, 1) to a sampling timing providing the maximum power, and outputs the estimated tap coefficient to FFF in plural array combining section 102 and a replica generating section in Viterbi equalizer 108.

5 Claims, 11 Drawing Sheets

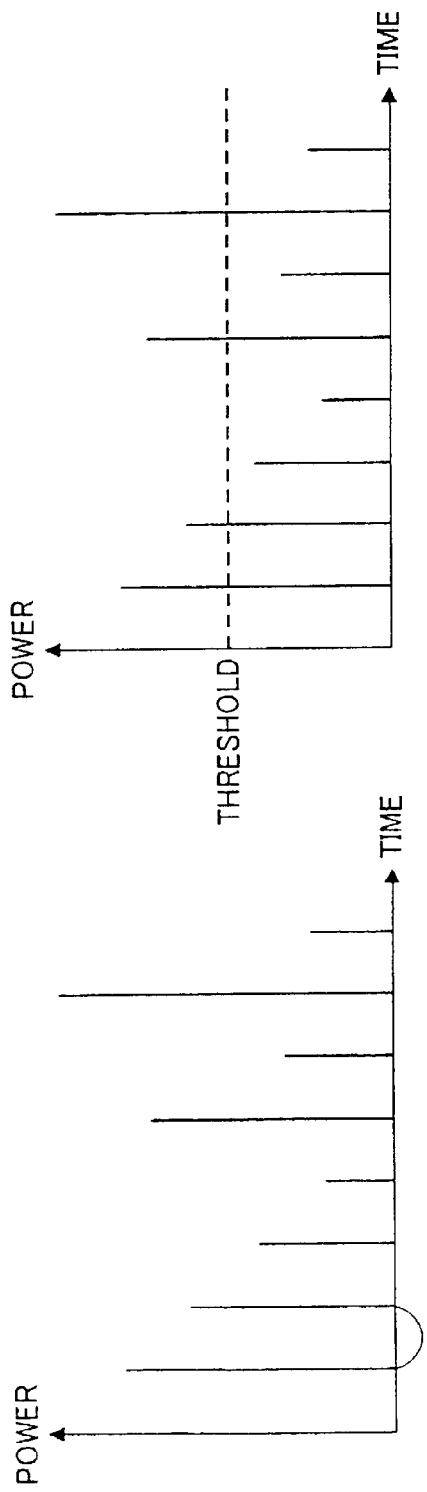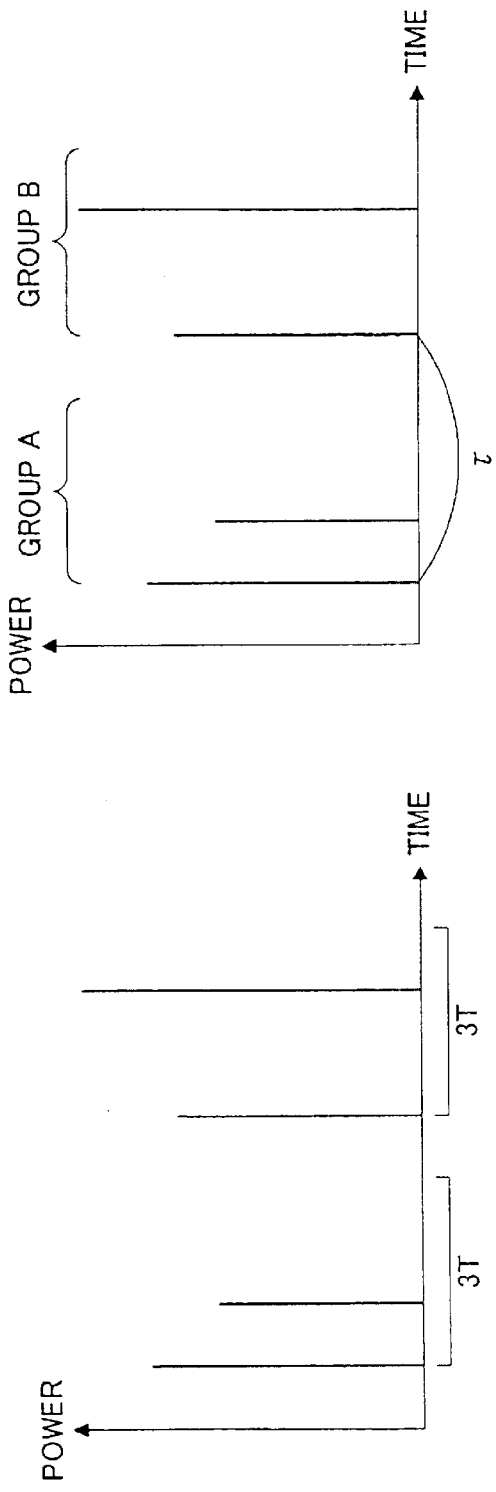

RECEPTION APPARATUS AND REPLICA SIGNAL GENERATING METHOD

TECHNICAL FIELD

The present invention relates to a reception apparatus and replica signal generating method, and more particularly, to a reception apparatus and replica signal generating method that adaptively updates tap coefficients of an array combining section and of an equalizer.

BACKGROUND ART

A conventional reception apparatus updates tap coefficients of an array combining section and of an equalizer adaptively, and thereby cancels interfering signal components and compensates for a distortion of a received signal generated on a propagation path. An example of the conventional reception apparatus is disclosed in Japanese Laid Open Patent Publication HEI10-336083.

The conventional reception apparatus is explained below using FIGS. 1 to 6. FIG. 1 is a partial block diagram illustrating a schematic configuration of the conventional reception apparatus. FIG. 2 is a partial block diagram illustrating a schematic configuration of a plural array combining section in the conventional reception apparatus. FIG. 3 is a partial block diagram illustrating a schematic configuration of a propagation path estimating section in the conventional reception apparatus. FIGS. 4A to 4D illustrate one example of a delay profile. FIG. 5 is a partial block diagram illustrating a schematic configuration of a Viterbi equalizer in the conventional reception apparatus. FIG. 6 is a partial block diagram illustrating a schematic configuration of a replica generating section in the conventional reception apparatus.

The entire configuration of the conventional reception apparatus is first explained using FIG. 1. In FIG. 1, plural array combining section 12 has processing systems, of which the number is the same as that of antennas, which combine signals received at respective antennas 11, and further combines resultants weighted and then combined for each antenna.

Timing control section 13 acquires symbol synchronization timings from outputs of reception processing sections provided for each antenna in plural array combining section 12. In addition, timing control section 13 is capable of acquiring a symbol synchronization timing from an output from one of the reception processing sections.

Propagation path estimating section 14 estimates a delay profile from outputs of the reception processing sections provided for each antenna in plural array combining section 12, and recognizes a spread condition of received signal components on the time axis. That is, propagation path estimating section 14 performs propagation path estimation. In order to converge the spread of received signal components in a range enabling delay compensation in Viterbi equalizer 16 described later, propagation path estimating section 14 calculates a time adjustment amount (τ shown in FIG. 4D) for a delayed wave to output to time adjustment section 22 in plural array combining section 12. Propagation path estimating section 14 is capable of performing the propagation path estimation from an output from one of the reception processing sections.

Tap coefficient estimating section 15 estimates a coefficient that minimizes a mean square of an error between a replica signal and a received signal (i.e., a weight based on the least square method), and outputs the estimated coefficient to feed forward filter (FFF) 23 in plural array combining section 12 and replica generating section 56 in Viterbi equalizer 16. The coefficients are used in FFF 23 and multipliers 65 to 69 in replica generating section 56.

Viterbi equalizer 16 generates the replica signal, and makes a decision on the received signal using the Viterbi algorithm with the difference between a received signal component subjected to array combining and the replica signal as likelihood information.

A configuration of plural array combining section 12 is next explained using FIG. 2. While a case is explained herein, for example, where the number of array elements is 2, and the number of path groups is 2, any numbers of array elements and of path groups may be applicable.

In FIG. 2, reception processing sections 21 perform reception processing on received signals from respective antennas. Time adjustment section 22 delays a reception-processing processed received signal based on an output from propagation path estimating section 14. FFF 23 performs weighting processing on the received signal based on the tap coefficient designated from tap coefficient estimating section 15. Combining section 24 combines all the FFF processed signals of respective paths from all antennas.

A configuration of propagation path estimating section 14 is next explained using FIG. 3. In FIG. 3, delay profile estimating section 31 estimates a delay profile of received signals components. An example of the delay profile is illustrated in FIG. 4A. In addition, in order to estimate a delay profile it may be possible to use the correlation value of a received signal with a known signal, or to use an impulse response value.

Maximum detecting section 32 detects a maximum level among power levels of the received signal components spread on the time axis in the estimated delay profile. Based on the maximum level of the power, threshold setting section 33 sets a threshold level to select only a path with excellent received condition. Any method may be applicable to determine the threshold level, for example, there is considered a method of obtaining predetermined percentages of the maximum level, or of subtracting a predetermined value from the maximum level. The delay profile with the threshold level set is illustrated in FIG. 4B.

Extracting section 34 extracts only a path with a received power level exceeding the threshold level set by threshold setting section 33. The delay profile with extracted paths is illustrated in FIG. 4C.

Classifying section 35 classifies the extracted paths into groups (groups of paths). The classification is performed so that the number of states in the Viterbi algorithm becomes as small as possible in consideration of a maximum delay time enabling compensation in Viterbi equalizer 16.

For example, in FIG. 4C, a delay time of a component having the greatest delay among extracted paths is 6T. Assuming herein that the maximum delay time enabling compensation in Viterbi equalizer 16 is up to 4T delay, when a received signal with the delay profile as illustrated in FIG. 4C is input to Viterbi equalizer 16 without any time adjustment, reception performance deteriorates largely due to an effect of the delayed wave beyond a compensation range.

Then, when a group is determined for each 3T delay interval (every 4 components), as illustrated in FIG. 4D, two groups of group A and group B are set. When time adjustment section 22 performs time adjustment on these groups later, since the delay time of the greatest delay component is 3T, signals of the groups can be efficiently equalized in Viterbi equalizer 16 capable of compensating up to 4T delay signal.

Further, when a received signal component group in which the delay time of the greatest delay component is 3T is input to Viterbi equalizer 16 capable of compensating up to 4T delay signal, the number of states in the Viterbi algorithm equals $4^3=64$, for example, at the time the modulation scheme is QPSK. The smaller the number of states is, the smaller the calculation amount is, and the more the processing rate is increased. Accordingly, in order to decrease the calculation amount, classifying section 35 may set the number of states to be as small as possible by determining a group for each delay time interval that is as small as possible in a range allowed by a spread condition of received signal components exceeding the threshold level. In addition, the number of groups is not limited to 2, and is determined arbitrarily.

Time adjustment amount detecting section 36 detects a time adjustment amount. That is, based on the classification result, time adjustment amount detecting section 36 detects a time amount by which each group is delayed to combine the group with the greatest delay group. For example, in this case, since the number of all the groups in FIG. 4D is 2, time adjustment amount detecting section 36 detects a time adjustment amount τ of group A by which group A is combined with group B that is the greatest delay group to provide to time adjustment section 22. In other words, the time adjustment amount V is a distance between beginning components of respective groups on the time axis. In addition, when there is a plurality of groups besides the greatest delay group, time adjustment amount detecting section 36 detects the time adjustment amount for each group.

A configuration of Viterbi equalizer 16 is next explained using FIG. 5. In FIG. 5, subtracter 51 subtracts a replica signal from a received signal. Error power calculating section 52 calculates power corresponding to an error from the subtracted result in subtracter 51.

Viterbi calculation section 53 is, for example, comprised of an MLSE circuit that performs Maximum Likelihood Sequence Estimation, and makes a decision on a received signal using the calculated power level corresponding to the error as likelihood information.

Memory 54 stores a known signal. Switch 55 outputs the known signal stored in memory 54 to replica generating section 56 in the case of tap coefficient estimation using the known signal, while in the other case except the estimation, outputting a symbol sequence candidate output from Viterbi calculation section 53 to replica generating section 56, based on a symbol synchronization timing output from timing control section 13.

Replica generating section 56 multiplies the known signal delayed based on an output of propagation path estimating section 14 or the symbol sequence candidate of received signal by a tap coefficient estimated in tap coefficient estimating section 15, and thereby generates a replica signal.

A configuration of replica generating section 56 is next explained using FIG. 6. In FIG. 6, each of delay sections 61 to 64 delays an input signal so that the reception apparatus fetches a received signal component at each sample timing. While any number of delay sections may be applicable, the number is herein assumed to be 4. Further, assuming that a delay amount at each delay section is one symbol duration, the reception apparatus is capable of fetching up to 4T delayed wave maximum.

Each of multipliers 65 to 69 multiplies the known signal component or symbol sequence candidate by a respective tap coefficient estimated in tap coefficient estimating section 15. Delayed waves each weighted are added in adder 70. The replica signal is thereby generated.

At this point, since the tap coefficient is estimated so as to minimize the mean square of a difference between the received signal and the replica signal, it is considered that in a constitution where all the tap coefficients are estimated autonomously in tap coefficient estimating section 15, all the tap coefficients converge to 0, and that functions of the array and Viterbi equalizer are lost.

Therefore, a tap coefficient input to multiplier 65 provided at a tap corresponding to a first wave is generally set to a fixed value (for example, 1), and under the condition that the tap coefficient to be multiplied by the first wave is 1, respective optimal tap coefficients to be multiplied by a 1T delayed wave to 4T delayed wave are estimated in tap coefficient estimating section 15, and multiplied respectively in multipliers 66 to 69.

In addition, in a replica generating section of the conventional reception apparatus, while FIG. 6 illustrates the case where the tap coefficient to be multiplied by a first wave is a fixed value of 1, the fixed value is not limited to 1. For example, JP HEI-336083 mentioned previously describes that the tap coefficient is fixed to −1 (constant).

Thus, in the conventional reception apparatus which adaptively updates tap coefficients in a replica generating section so as to minimize a mean square of a difference between a received signal and a replica signal, a tap coefficient to be multiplied by a first wave (0T delayed wave) in the replica generating section is set at a fixed value (for example, 1), whereby it does not happen that all the tap coefficients converge to 0. Accordingly, the conventional reception apparatus is capable of updating the tap coefficients stably.

In addition, the tap coefficients for delayed waves are estimated to be optimal when the tap coefficient for a first wave is a fixed value (herein, 1). Accordingly, a tap to which the fixed value is input (hereinafter referred to as "fixed value input tap") is determined to be the tap for the first wave, whereby the tap coefficients can be estimated to maximize the SNR (Signal Noise Ratio) of the first wave.

In the conventional reception apparatus, however, there is a problem that the SNR of a received signal is not reserved sufficiently when a received level of a first wave falls below a received level of a delayed wave due to an effect of fading or the like.

In other words, when a position of the fixed value input tap is fixed to be a tap corresponding to the first wave, the conventional reception apparatus operates so as to maximize the SNR of the first wave even in a condition where the received level of the first wave falls below the received level of the delayed wave. As a result, the conventional reception apparatus is not capable of obtaining the SNR of the received signal sufficiently despite the delayed wave with a sufficient received level to some extent arriving.

DISCLOSURE OF INVENTION

It is an object of the present invention to provide a reception apparatus and replica signal generating method enabling improved reception performance even in a condition where a received level of a first wave falls below a received level of a delayed wave.

To achieve the above object, in the present invention, a position of a fixed value input tap is made variable at the time a replica signal is generated, based on received signal components subjected to time adjustment and then combining in such a way as to converge the components in a range enabling the compensation in an equalizer.

BRIEF DESCRIPTION OF DRAWINGS

FIG. 4A is a diagram illustrating an example of a delay profile;

FIG. 4B is a diagram illustrating the example of a delay profile;

FIG. 4C is a diagram illustrating the example of a delay profile;

FIG. 4D is a diagram illustrating the example of a delay profile;

BEST MODE FOR CARRYING OUT THE INVENTION

Embodiments of the present invention are explained in detail below with reference to accompanying drawings.

First Embodiment

A reception apparatus according to this embodiment variably determines a position of a fixed value input tap at the time a replica signal is generated, corresponding to a level of a received signal component subjected to time adjustment. The fixed value input tap is conventionally fixed to a tap corresponding to a first wave (0T delay wave).

Figure 1:
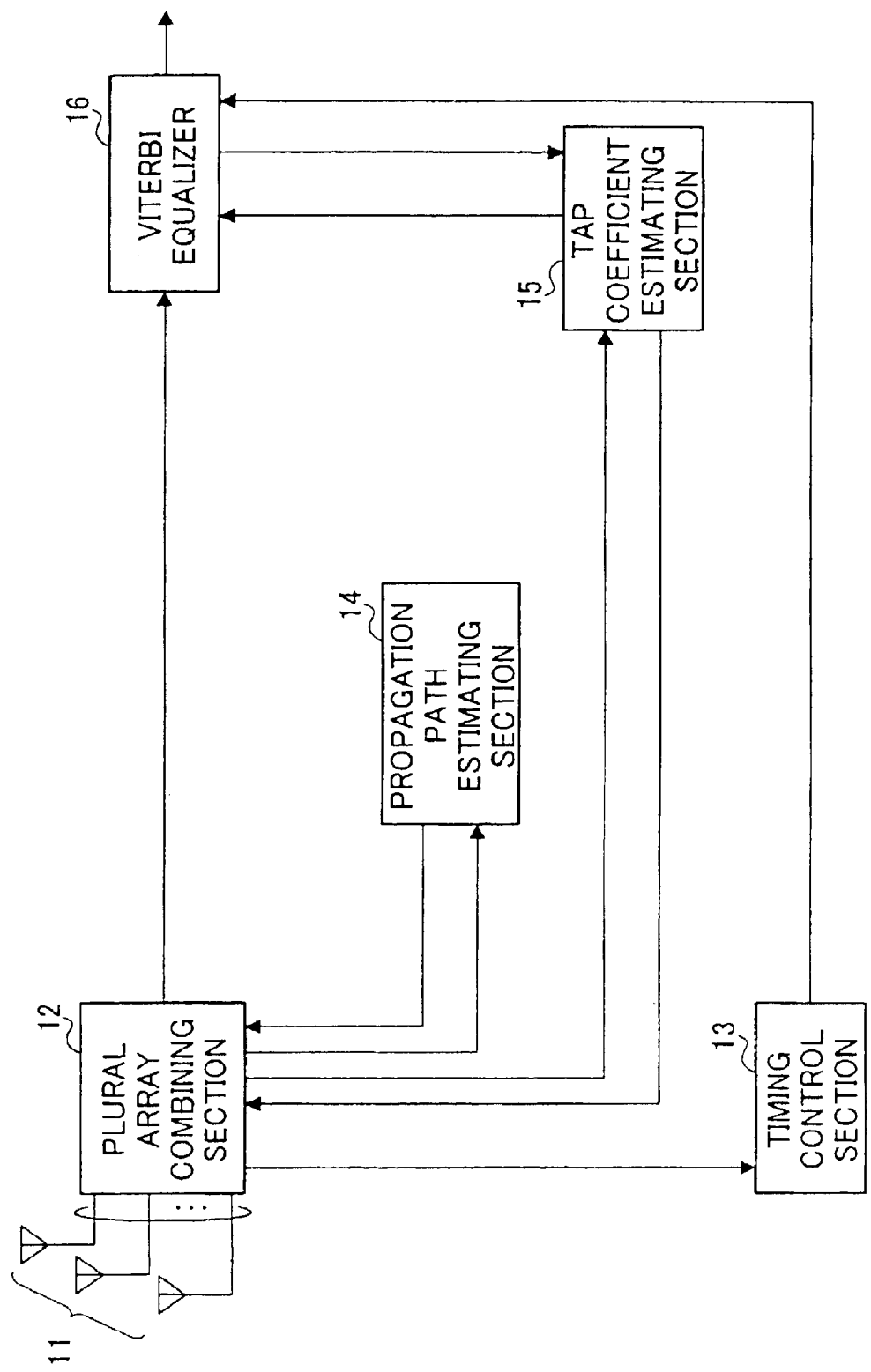
FIG. 1 is a partial block diagram illustrating a schematic configuration of a conventional reception apparatus.
Figure 2:
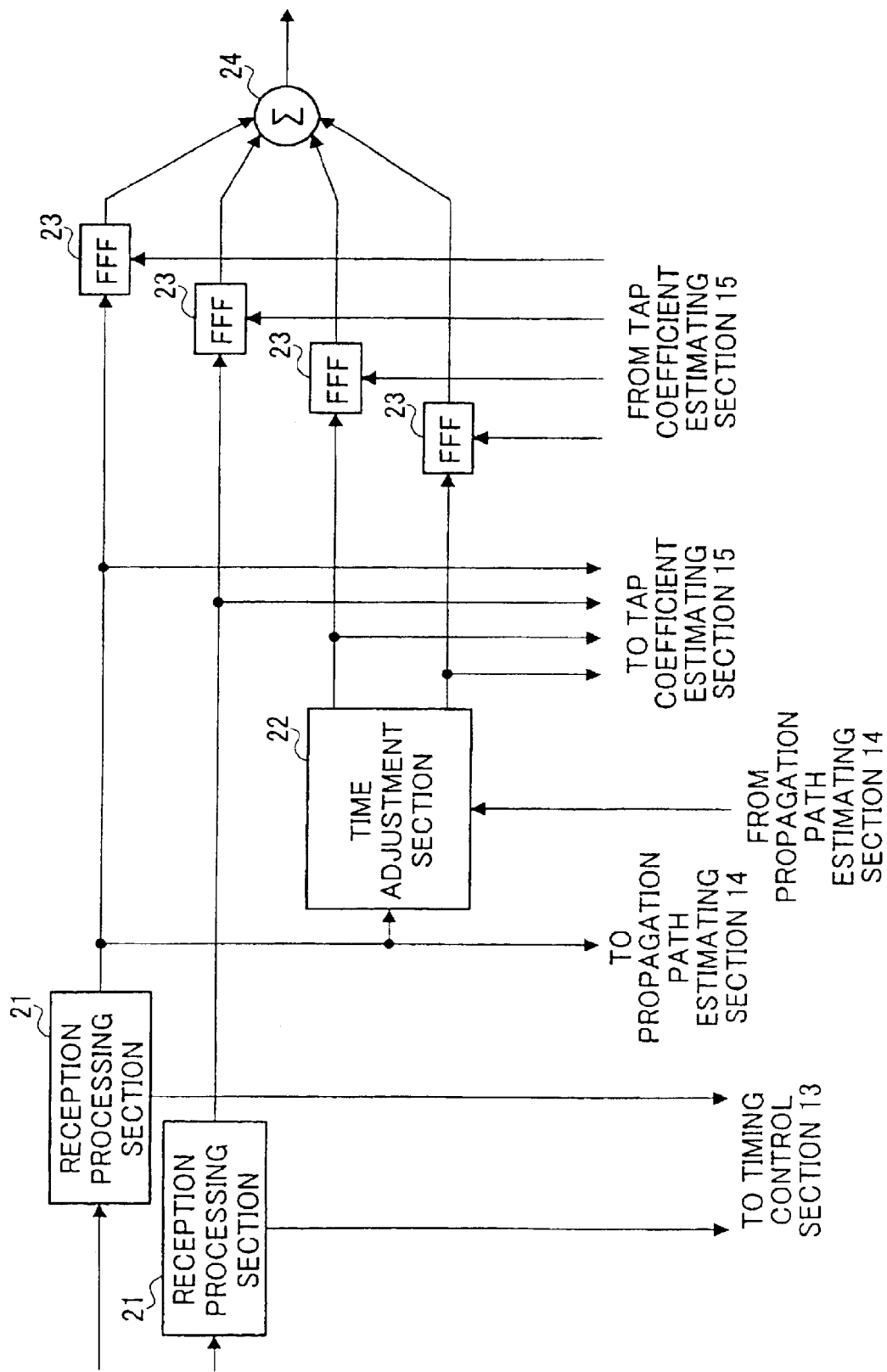
FIG. 2 is a partial block diagram illustrating a schematic configuration of a plural array combining section in the conventional reception apparatus.
Figure 3:
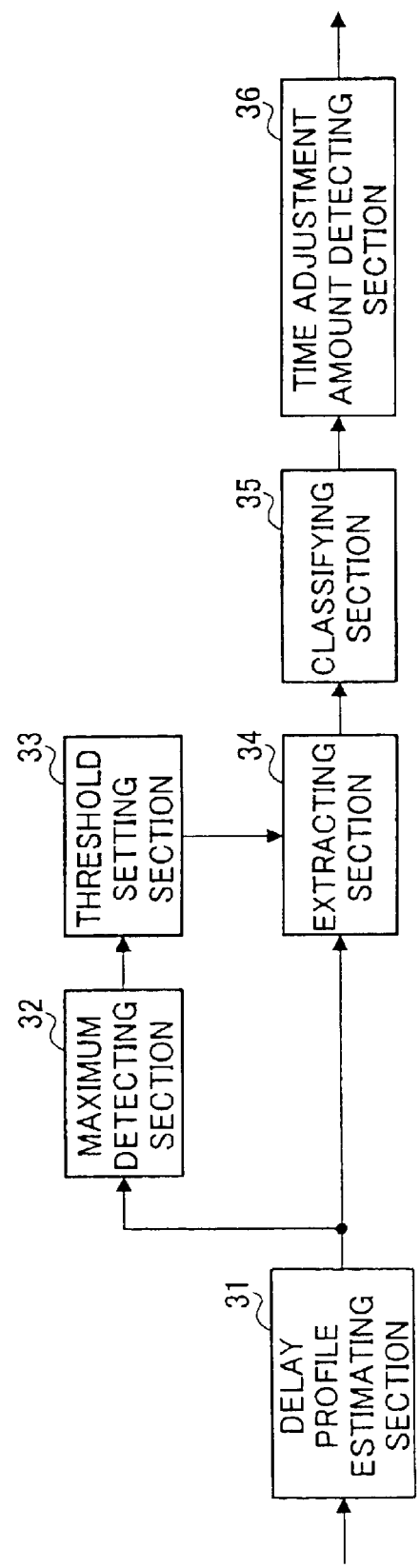
FIG. 3 is a partial block diagram illustrating a schematic configuration of a propagation path estimating section in the conventional reception apparatus.
Figure 5:
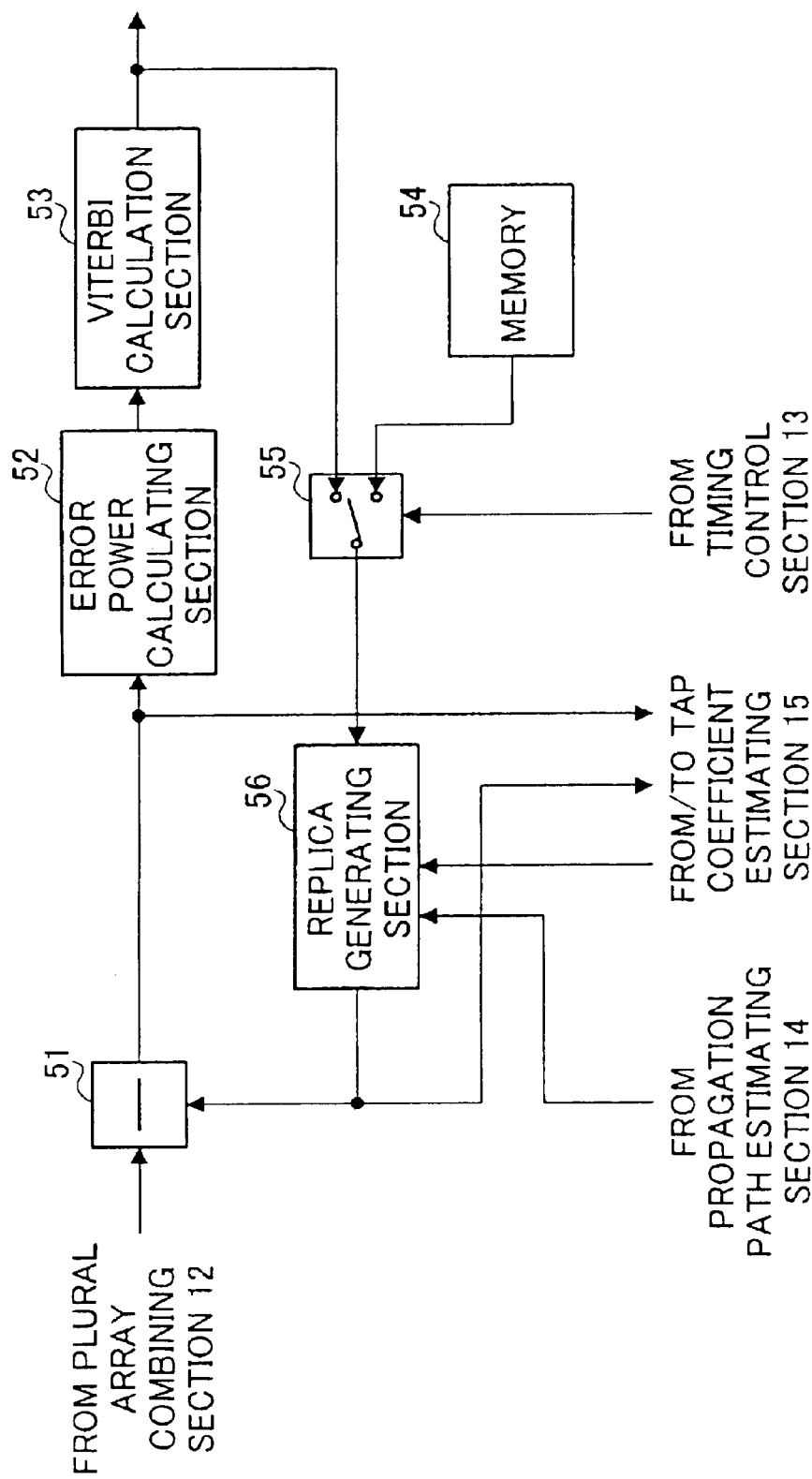
FIG. 5 is a partial block diagram illustrating a schematic configuration of a Viterbi equalizer in the conventional reception apparatus.
Figure 6:
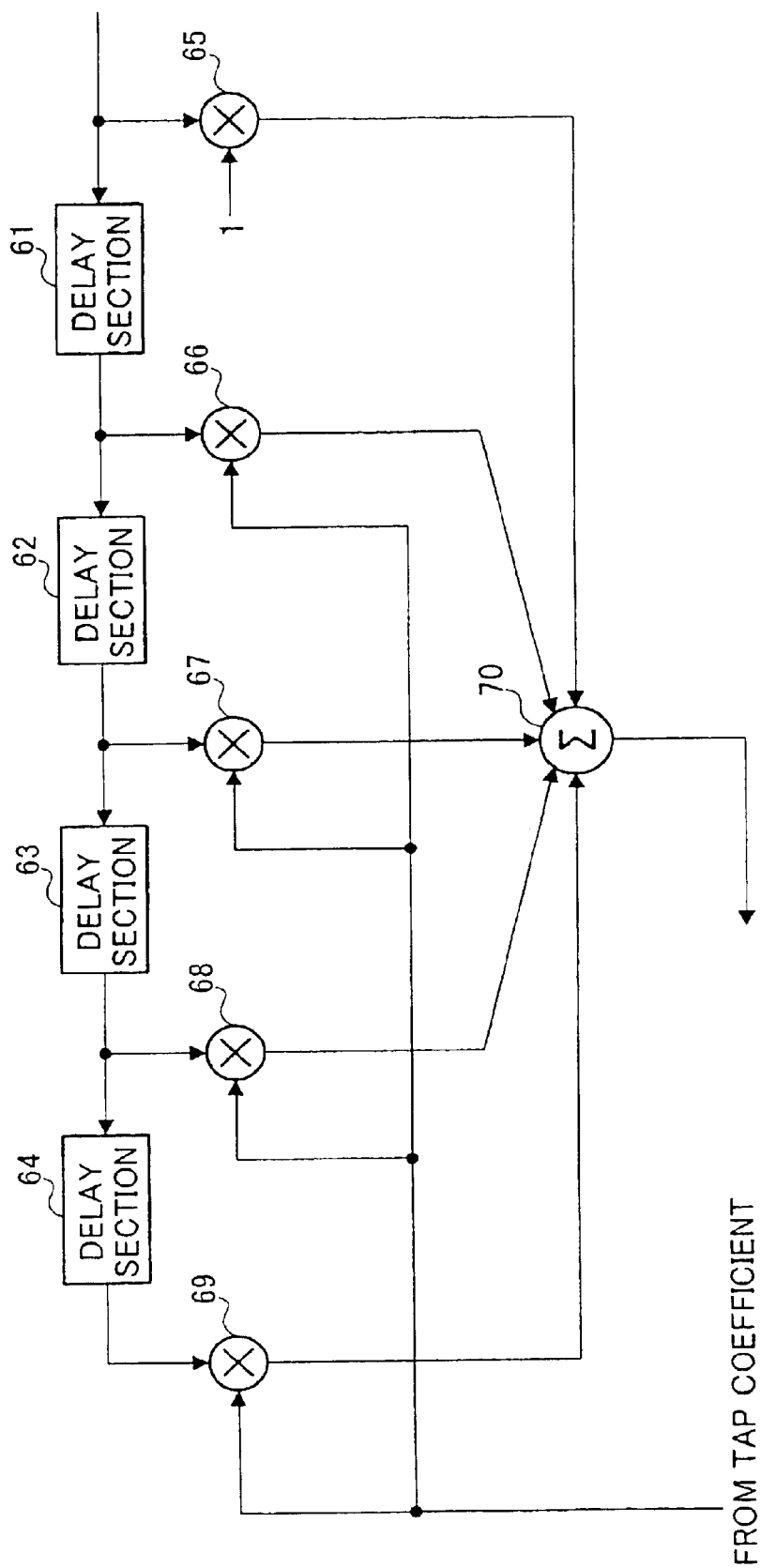
FIG. 6 is a partial block diagram illustrating a schematic configuration of a replica generating section in the conventional reception apparatus.
Figure 7:
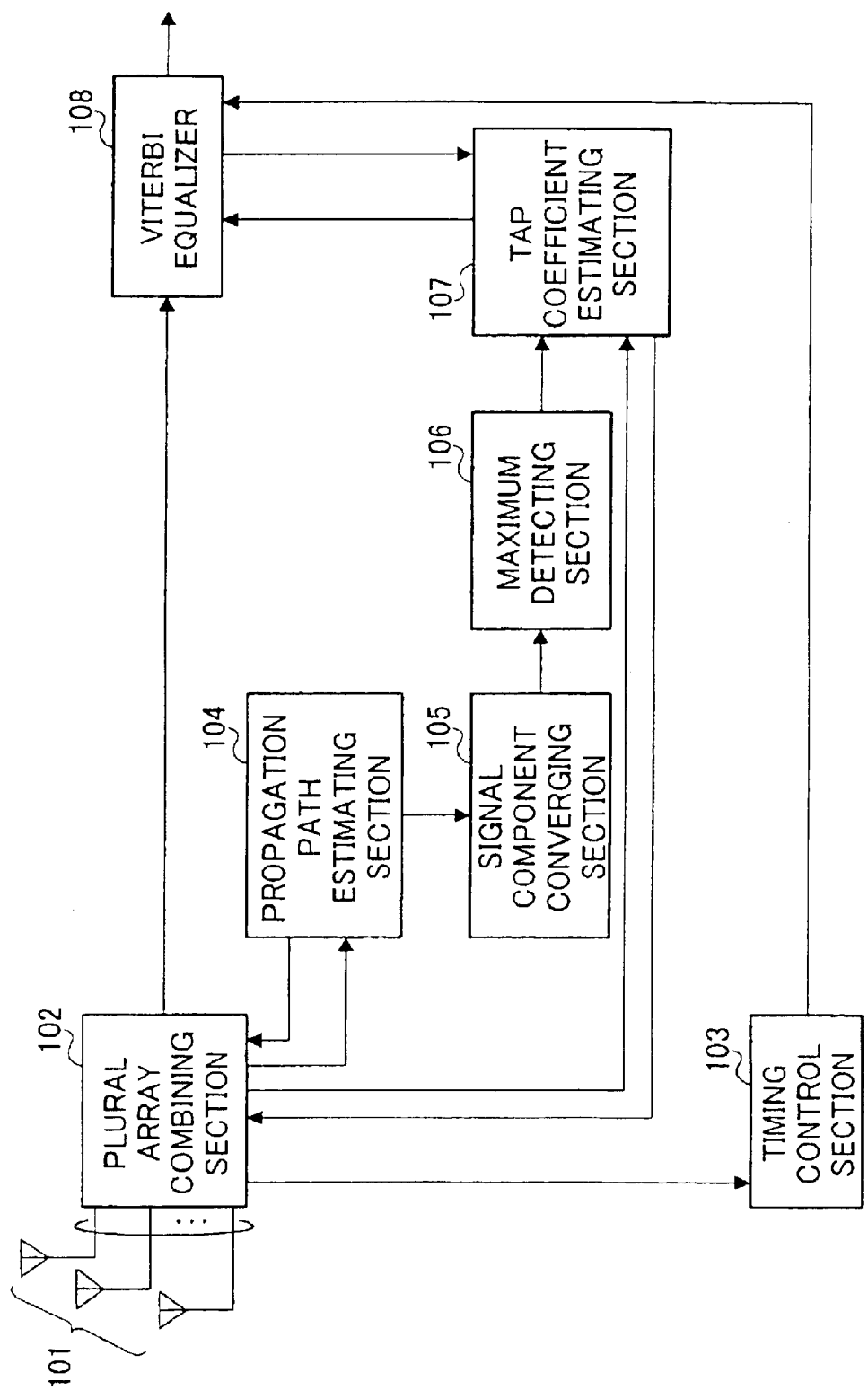
FIG. 7 is a partial block diagram illustrating a schematic configuration of a reception apparatus according to a first embodiment of the present invention.
Figure 8B:
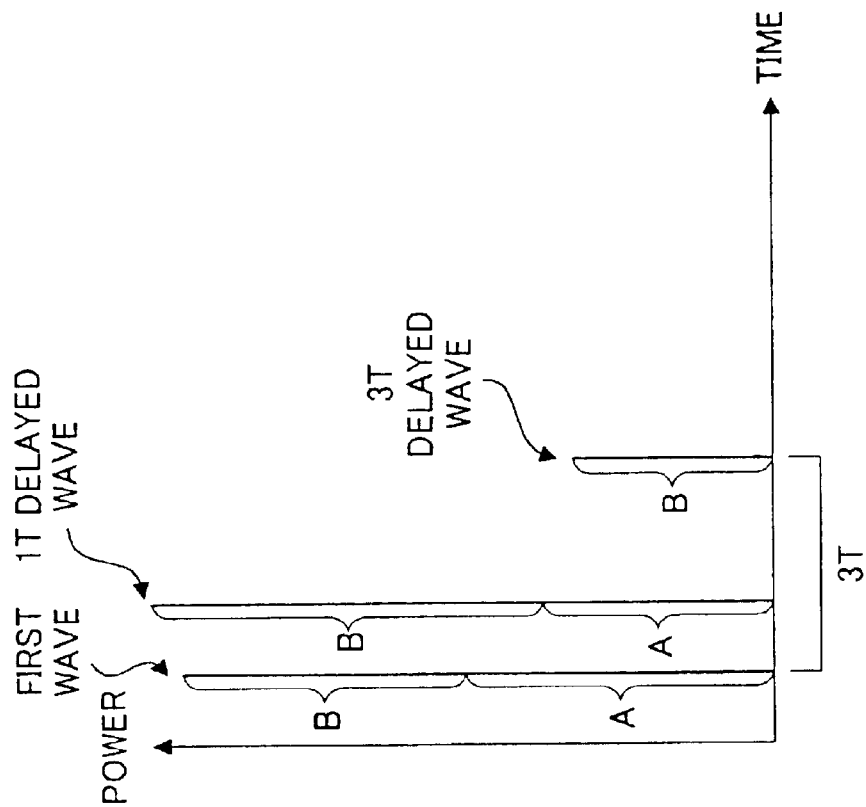
FIG. 8B is a diagram illustrating one example of a delay profile after the signals are combined.
Figure 8A:
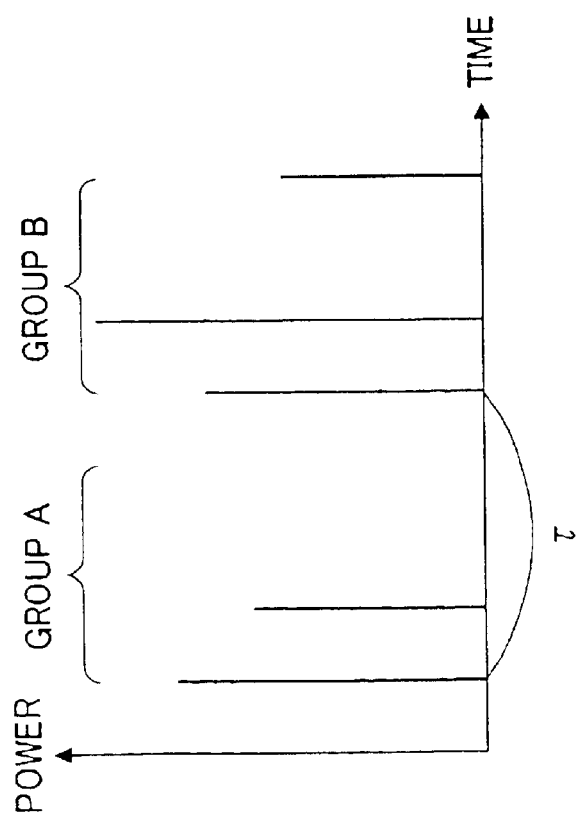
FIG. 8A is a diagram illustrating example of a delay profile before signals are combined.
Figure 9:
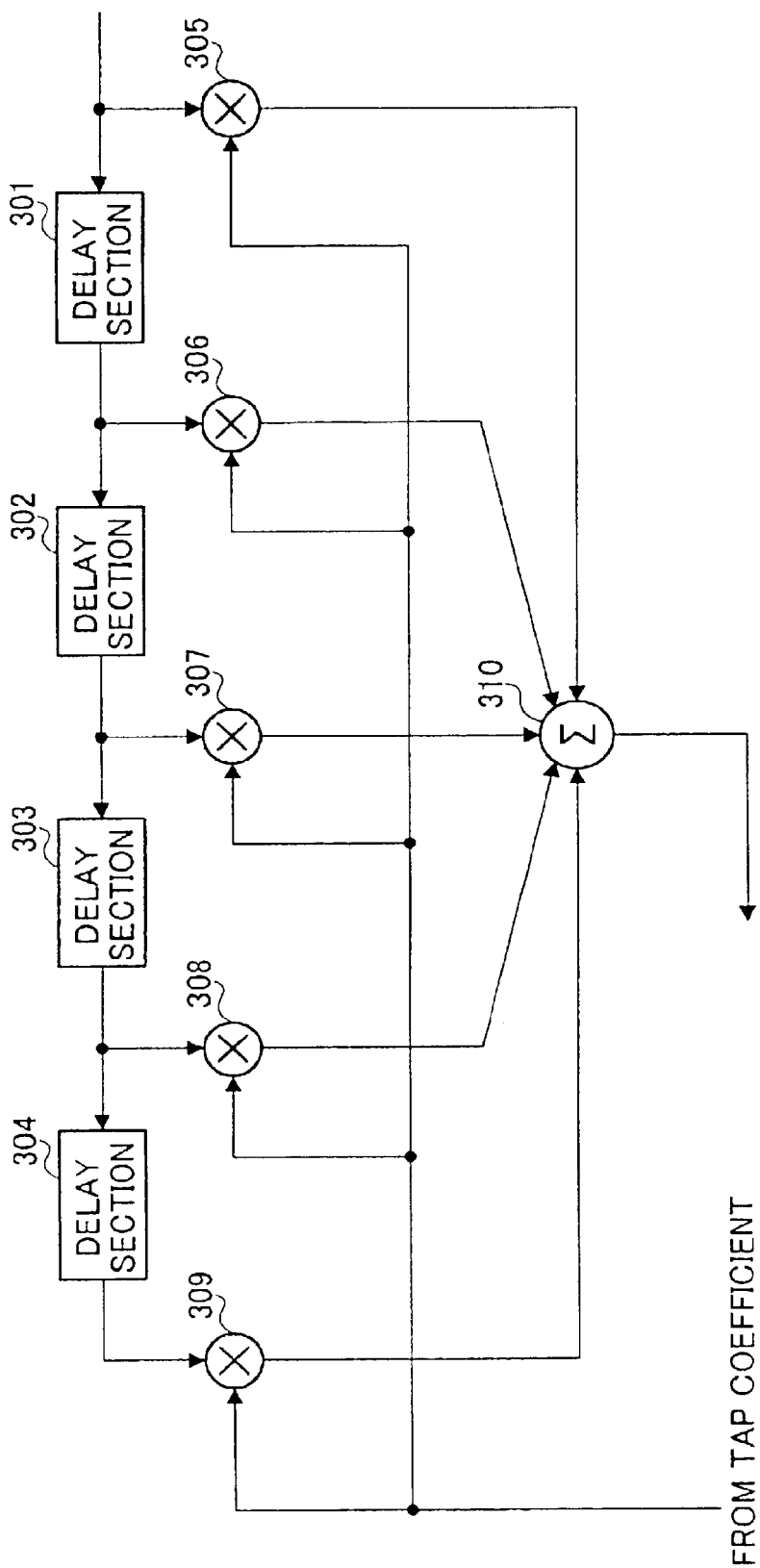
FIG. 9 is a partial block diagram illustrating a schematic configuration of a replica generating section in the reception apparatus according to the first embodiment of the present invention.
Figure 10:
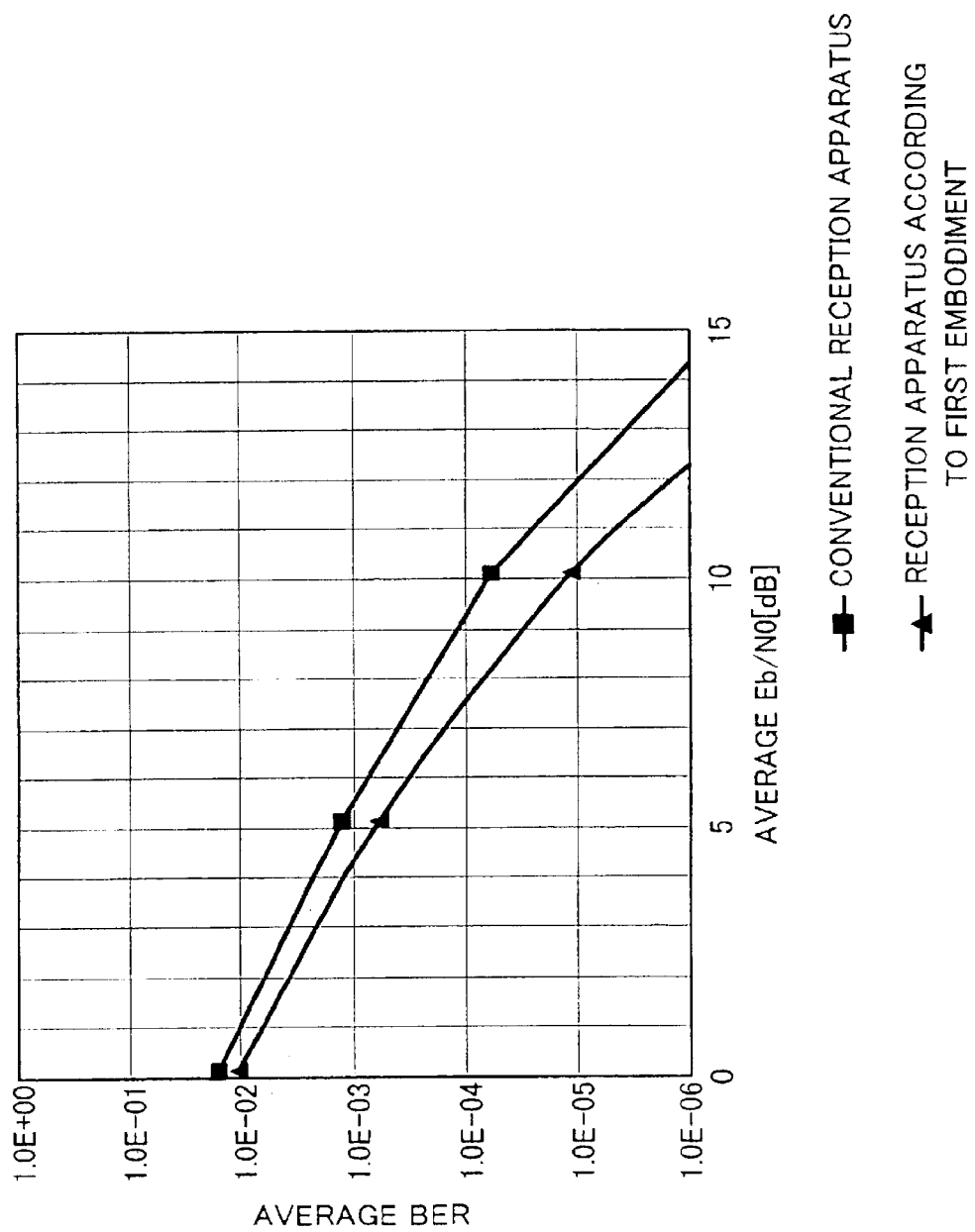
FIG. 10 is a graph showing a result of computer simulation with respect to performance of the convention reception apparatus and of the reception apparatus according to the first embodiment of the present invention.

The reception apparatus according to this embodiment is explained below using FIG. 7 to FIG. 10. FIG. 7 is a partial block diagram illustrating a schematic configuration of the reception apparatus according to this embodiment of the present invention. FIG. 8A is a diagram illustrating one example of a delay profile before signals are combined. FIG. 8B is a diagram illustrating one example of a delay profile after the signals are combined. FIG. 9 is a partial block diagram illustrating a schematic configuration of a replica generating section in the reception apparatus according to the first embodiment of the present invention. FIG. 10 is a graph showing a result of computer simulation with respect to performance of the conventional reception apparatus and of the reception apparatus according to the first embodiment of the present invention.

The entire configuration of the reception apparatus according to this embodiment is first explained using FIG. 7. In FIG. 7, plural array combining section 102 has processing systems, of which the number is the same as that of antennas, which combine signals received at respective antennas 101, and further combines resultants weighted and then combined for each antenna. A configuration and function of plural array combining section 102 are the same as those of the plural array combining section of the conventional reception apparatus, and therefore the detailed explanation of plural array combining section 102 is omitted.

Timing control section 103 acquires symbol synchronization timings from outputs of reception processing sections provided for each antenna in plural array combining section 102. In addition, timing control section 103 is capable of acquiring a symbol synchronization timing from an output from one of the reception processing sections.

Propagation path estimating section 104 estimates a delay profile from outputs of the reception processing sections provided for each antenna in plural array combining section 102 to perform propagation path estimation. A configuration and function of propagation path estimating section 104 are the same as those of the propagation path estimating section in the conventional reception apparatus, and therefore the detailed explanation of propagation path estimating section 104 is omitted. FIG. 8A illustrates one example of an output of propagation path estimating section 104. In addition, propagation path estimating section 104 is capable of performing the propagation path estimation from an output from one of the reception processing sections.

Signal component converging section 105 converges received signal components spread on a time axis and combines the signal components. FIG. 8B illustrates one example of an output from signal component converging section 105. Signal component converging section 105 delays each signal component of group A by a time adjustment amount τ to add respective signal components of group A and group B for each delayed wave, i.e., to obtain levels of 0T delayed waves (first waves), 1T delayed waves, 2T delayed waves and so on.

Maximum detecting section 106 detects a sample timing of a signal component with the maximum power among signal components combined in signal component converging section 105. In the example illustrated in FIG. 8B, the 1T delayed wave has the highest received level. The detected result is provided to tap coefficient estimating section 107.

Tap coefficient estimating section 107 estimates a coefficient that minimizes a mean square of a difference between a replica signal and a received signal (i.e., a weight based on the least square method) based on the detected result in maximum detecting section 106, and outputs the estimated coefficient to FFF in plural array combining section 102 and the replica generating section in Viterbi equalizer 108.

In addition, tap coefficient estimating section 107 assigns a tap coefficient of a fixed value (for example, 1) to a signal component with the maximum power among combined signal components based on the output of maximum detecting section 106 in estimating above-mentioned tap coefficients. In the example in FIG. 8B, tap coefficient estimating section 107 sets a tap coefficient for the 1T delayed wave at a fixed value.

Viterbi equalizer 108 generates the replica signal, and makes a decision using the Viterbi algorithm with the difference between the replica signal and a received signal component subjected to the time adjustment and then to array combining as likelihood information. In addition, a configuration and function of Viterbi equalizer 108 are the same as those of the Viterbi equalizer in the conventional reception apparatus, and therefore the detailed explanation thereof is omitted.

A configuration of the replica generating section in Viterbi equalizer 108 is next explained using FIG. 9. In FIG. 9, each of delay sections 301 to 304 delays an input signal so that the reception apparatus fetches the received signal component at each sample timing.

Each of multipliers 305 to 309 multiplies a known signal component or symbol sequence candidate by the tap coefficient. Signal components each weighted by the respective tap coefficient are added in adder 301. The replica signal is thereby generated.

At this point, tap coefficient estimating section 107 sets a tap coefficient corresponding to a combined signal component with the maximum power at a fixed value (herein, 1). That is, tap coefficient estimating section 107 sets the tap coefficient to be multiplied on a tap corresponding to the sample timing detected in maximum detecting section 106 at the fixed value (herein, 1). Specifically, in the example in FIG. 8B, since a 1T delayed wave has a maximum level, tap coefficient estimating section 107 sets a tap coefficient to be input to multiplier 306 at the fixed value of 1. Further, tap coefficient estimating section 107 estimates tap coefficients to be input to multipliers except multiplier 306 so as to minimize a mean square of a difference between the received signal and the replica signal under the condition the tap coefficient for the 1T delayed wave is 1.

Thus, since a position of a fixed value input tap is variable, a tap coefficient to be input to multiplier 307 is set at the fixed value of 1 when the power of a 2T delayed wave is maximum, a tap coefficient to be input to multiplier 308 is set at the fixed value of 1 when the power of a 3T delayed wave is maximum, and a tap coefficient to be input to multiplier 305 is set at the fixed value of 1 when the power of a first wave (0T delayed wave) is maximum.

The operation of the reception apparatus with the above configuration is next explained.

A signal undergoing various distortions in a propagation path is received at antenna 101. Plural array combining section 102 performs reception processing on a received signal. Timing control section 103 detects a symbol synchronization timing using the reception-processing processed received signal.

Propagation path estimating section 104 performs propagation path estimation using the reception-processing processed received signal. Further, in order to converge the spread of received signal components in a range enabling the compensation in Viterbi equalizer 108, propagation path estimating section 104 estimates a time adjustment amount for a delayed wave. The estimation of the time adjustment amount is performed on a signal component with power exceeding a threshold in a delay profile.

Next, based on the time adjustment amount output from propagation path estimating section 104, signal component converging section 105 subjects the signal components to time adjustment and then combining to generate a delay profile. Then, maximum detecting section 106 detects a sample timing of a signal component with the maximum power among combined signal components.

The difference between the received signal and the replica signal calculated in Viterbi equalizer 108 is provided to tap coefficient estimating section 107. Then, tap coefficient estimating section 107 sets the tap coefficient for the combined signal component with the maximum power at a fixed value (herein, 1), while estimating other tap coefficients so as to minimize the mean square of the difference between the received signal and the replica signal. According to the series of operations, tap coefficients to be input to FFF in plural array combining section 102 and the replica generating section in Viterbi equalizer 108 are sequentially updated.

A computer simulation result performed by the inventors of the present invention is next explained using FIG. 10.

The inventors compare performance of the conventional reception apparatus as mentioned previously (i.e., the reception apparatus that always sets the tap coefficient to be multiplied by the first wave at 1) with performance of the reception apparatus according to this embodiment (i.e., the reception apparatus that makes a position of the fixed value input tap variable) under conditions shown in the following table.

| Item | Setting |
| --- | --- |
| Modulation scheme | QPSK ($\alpha = 0.5$) |
| Training symbol | 31 |
| Data symbol | 386 |
| Adaptive algorithm | RLS ($\lambda = 0.999$) |
| Equalizer | MLSE |
| Form of array antenna | Half-wavelength interval linear array |
| Array incident angle and level | fixed |
| The number of array FFF taps | 2 |
| The number of replica taps | 2 |
| Incident angle | $-18°, -54°$ $18°, 54°$ |
| The number of branches | 3 |
| The number of paths | 4 |
| Delay time | 0, T, 10T, 11T |
| Average path level | Equal level |
| Interfering wave | None |
| fD | fDT → 0 |

The simulation result is shown in FIG. 10. As shown in FIG. 10, under the above conditions, the reception apparatus according to this embodiment exhibits a remarkable effect that the Eb/NO is improved by about 2 dB at a point where the BER equals 1.0E-5 as compared to the conventional reception apparatus.

Thus, according to this embodiment, a position is made variable of a fixed value input tap corresponding to a level of each combined signal component, which is conventionally fixed to a tap corresponding to a first wave (0T delayed wave), at the time of replica signal generation, whereby it is possible to adaptively estimate and update tap coefficients so as to maximize the SNR on a path with a highest received level to generate a replica signal. Therefore according to this embodiment, it is possible to improve reception performance even when a received level of a first wave falls below a received level of a delayed wave.

Second embodiment

A reception apparatus according to this embodiment is different from the reception apparatus according to the first embodiment in a point that a position of the fixed value input tap is determined using the number of combined signal components, instead of using power levels of the combined signal components.

In this embodiment, a tap corresponding to a sample timing with the largest number of combined signal components is determined as the position of the fixed value input tap. This embodiment thereby eliminates the calculation for obtaining power levels of the combined signal components to decrease the calculation amount, and simplifies a hardware scale.

Figure 11:
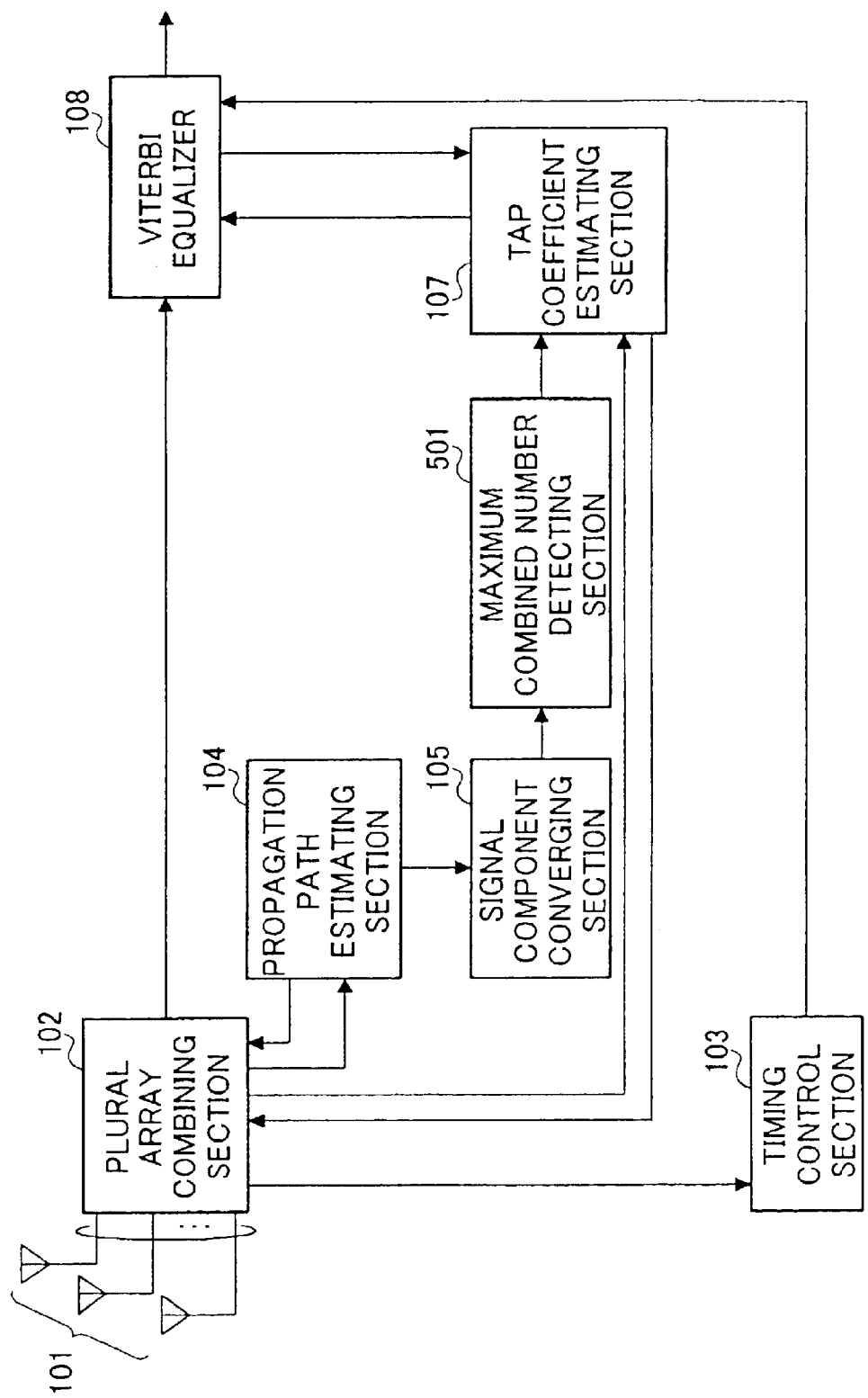
FIG. 11 is a partial block diagram illustrating a schematic configuration of a reception apparatus according to a second embodiment of the present invention.

The reception apparatus according to this embodiment is next explained below using FIG. 11. FIG. 11 is a partial block diagram illustrating a schematic configuration of the reception apparatus according to the second embodiment of the present invention. In addition, the same components as those in the first embodiment are assigned the same reference numerals to omit the detailed explanations thereof.

In FIG. 11, maximum combined number detecting section 501 detects a sampling position where the number of combined signal components is the largest. It is assumed to select a position with a shorter delay time (i.e., position timewise closer to the first wave) when the numbers of combined signal components are the same.

For example, when an output of signal component converging section 105 is indicative of a profile as shown in FIG. 8B previously described, the number of combined signal components of the first wave (0T delayed wave), 1T delayed wave, 2T delayed wave or 3T delayed wave is respectively 2, 2, 0 or 1. Accordingly, the first wave (0T delayed wave) is detected as a delayed wave with the largest number of combined signal components, and the detected result is provided to tap coefficient estimating section 107.

The tap coefficient estimating section 107 determines a position of the fixed value input tap so that a tap coefficient to be multiplied by the signal component with the largest number of combined signal components (herein, the first wave) is a fixed value, while estimating other tap coefficients. Then, tap coefficient estimating section 107 outputs these tap coefficients to the replica generating section in Viterbi equalizer 108.

Thus, according to this embodiment, power levels of combined signal components are not detected, and according to the numbers of combined signal components, it is determined that a tap coefficient corresponding to either delayed wave is set at a fixed value, whereby it is possible to decrease the calculation amount and thereby increase the processing rate, and consequently largely simplify the hardware scale, as compared to the reception apparatus according to the first embodiment.

In addition, in the first and second embodiments, the update of the tap coefficients is performed, for example, for each slot.

In addition, while the first and second embodiments explain the configuration using a plurality of adaptive array antennas, the present invention is not limited to this condition. That is, the first and second embodiments may be applicable to a case of using a signal adaptive array antenna and another case of using an ordinary antenna instead of using the adaptive array antenna.

As explained above, according to the present invention, a position is made variable of a fixed value input tap at the time a reception signal is generated, based on received signal components subjected to time adjustment and then combining in such a way as to converge the components in a range enabling the compensation in an equalizer, whereby it is possible to improve reception performance even when a received level of a first wave falls below a received level of a delayed wave.

This application is based on the Japanese Patent Application No.HEI11-152030 filed on May 31, 1999, entire content of which is expressly incorporated by reference herein.

INDUSTRIAL APPLICABILITY

The present invention is applicable to a base station apparatus used in a radio communication system, and further is applicable to a communication terminal apparatus performing a radio communication with the base station apparatus.

What is claimed is:

1. A reception apparatus comprising:
   an extraction section that extracts signal components whose received power is greater than or equal to a predetermined level, from signal components of a received signal, at a plurality of sample timings;
   a combining section that classifies the extracted signal components into a plurality of groups and combining corresponding signal components from said plurality of groups;
   an estimation section that estimates a plurality of tap coefficients that each correspond to respective ones of the combined signal components; and
   a generating section that generates a replica of the received signal by multiplying the estimated tap coefficients by said respective combined signal components,
   wherein said estimation section sets to a fixed value a tap coefficient, among said plurality of tap coefficients, that corresponds to a combined signal component with the largest number of signal components.

2. The reception apparatus according to claim 1, wherein, when there are a plurality of combined signal components with the largest number of signal components, said estimation section sets to a fixed value a tap coefficient corresponding to a combined signal component of an earliest sample timing.

3. A communication terminal apparatus comprising a reception apparatus of claim 1.

4. A base station apparatus comprising a reception apparatus of claim 1.

5. A replica signal generation method comprising:
   extracting signal components whose received power is greater than or equal to a predetermined level from signal components of a received signal, at a plurality of sample timings;
   classifying the extracted signal components into a plurality of groups and combining corresponding signal components from said plurality of groups;
   estimating a plurality of tap coefficients that each correspond to respective ones of the combined signal components; and
   generating a replica of the received signal by multiplying the estimated tap coefficients by said respective combined signal components,
   wherein a tap coefficient, among said plurality of tap coefficients, that corresponds to a combined signal component with the largest number of signal components is set to a fixed value.

* * * * *